United States Patent
Shapovalov et al.

(10) Patent No.: US 6,520,219 B2
(45) Date of Patent: Feb. 18, 2003

(54) METHOD AND APPARATUS FOR STORING COMPRESSED GAS

(75) Inventors: Vladimir I. Shapovalov, Tucson, AZ (US); Raouf O. Loutfy, Tucson, AZ (US)

(73) Assignee: Materials and Electrochemical Research (MER) Corporation, Tucson, AZ (US)

(*) Notice: Subject to any disclaimer, the term of this patent is extended or adjusted under 35 U.S.C. 154(b) by 0 days.

(21) Appl. No.: 09/945,251

(22) Filed: Aug. 31, 2001

(65) Prior Publication Data

US 2002/0069929 A1 Jun. 13, 2002

Related U.S. Application Data

(63) Continuation-in-part of application No. 09/658,511, filed on Sep. 8, 2000.

(51) Int. Cl.$^7$ .............................................. B65B 1/04
(52) U.S. Cl. .......................................... 141/4; 141/237
(58) Field of Search .............................. 141/1, 2, 4, 18, 141/237–245

(56) References Cited

U.S. PATENT DOCUMENTS 4,153,083 A * 5/1979 Imler et al. ................... 141/237
5,954,099 A * 9/1999 Princiotta et al. ............. 141/18

* cited by examiner

Primary Examiner—Steven O. Douglas
(74) Attorney, Agent, or Firm—Jerome M. Teplitz

(57) ABSTRACT

A compressed gas such as hydrogen is stored at elevated pressure by introducing it into a plurality of storage cells having a common gas distribution manifold thereby maintaining the same pressure in all cells. The flow of gas between the manifold in any given cell is blocked in the event of a sudden pressure drop in such cell such as may occur in the event of a leak in the cell. Preferably, the cells are constructed in modular form to include a plurality of the cells and the modular material is preferably made of porous gasar material. The low pressure, i.e., leaky cell, is preferably blocked by a closure formed of pliable rubber like material that is forced against the passageway leading from the manifold to the cell by higher gas pressure in the manifold, which occurs when the pressure becomes lower in the given cell due to a leak.

54 Claims, 7 Drawing Sheets

Section A-A

Sectional A-A

METHOD AND APPARATUS FOR STORING COMPRESSED GAS

This is a continuation-in-part of U.S. patent application Ser. No. 09/658,511, filed Sep. 8, 2000.

The present invention relates to a method of containing compressed gas and to systems for carrying out such containment; and, particularly to such method and systems for storing hydrogen and other potentially explosive gases in a safe environment.

BACKGROUND OF THE INVENTION

The problem of creating safe, capacious and convenient storage for compressed gas (predominantly hydrogen), is one of the most important aspects of hydrogen energy development [1–3]. Some hydrogen storage methods currently available are [4–8]:

Compressed gaseous hydrogen in gas-cylinders;

Liquid hydrogen at low temperatures in Dewar flasks;

Chemically combined hydrogen in hydride powder canisters;

Physical-chemical absorbed hydrogen in carbon nanotubes.

Each of these methods has merits and demerits. Hydride storage material is capable of spontaneous ignition in air. They show complexities associated with the accumulation and extraction of hydrogen. Finally, they are so very expensive that they can not be considered for large-scale use as a hydrogen storage medium.

The most convenient storage method is hydrogen high-pressure (15–25 MPa) storage in steel gas-cylinders. There are many types of gas storage cylinders, which contain toxic and other hazardous gases or liquids [9–18]. These cylinders fill and empty quickly without complications. However, the important weakness of this method is the danger of explosively rapid release of gas. The second (related) weakness of steel gas-cylinders is their limited mass fraction storage capacity. They are made heavier than required for pressure retention to ensure safety against impact, puncture or crushing damage.

OBJECTS AND ADVANTAGES OF PRESENT INVENTION

A primary object of the present invention is the creation of a new cellular storage system for compressed gas, which will combine safety with high capacity and yet be inexpensive and convenient, for use in aircraft and spacecraft. Such storage systems can be utilized also for ground vehicles as a hydrogen source for fuel cell electric generation.

SUMMARY OF THE INVENTION

In accordance with the present invention, by providing a storage system comprising a plurality of gas tight cells, preferably in modules, rather than a single gas cylinder of equivalent capacity, the danger of sudden total gas release will be reduced and the safety margin can therefore be reduced accordingly. The result is a much higher weight fraction of storage.

The idea of using a storage system with a plurality of cells formed of material having cellular structure as the basic gas storage block (cellular module) is the scientific and technical basis of a preferred aspect of this invention.

Multi cellular organisms demonstrate much more stability against environment negative impact than unicellular organisms. This principle underlies our invention. Therefore we have named our new device a Safe Cellular Storage (further—SCS).

The present invention is also embodied in the design of a system which incorporates means for automatically isolating destroyed gaseous storage cells from healthy cells, so that the SCS as a whole would remain efficient. This problem is solved by the system described and claimed below.

DETAILED DESCRIPTION OF THE PREFERRED EMBODIMENTS

Figure 1:
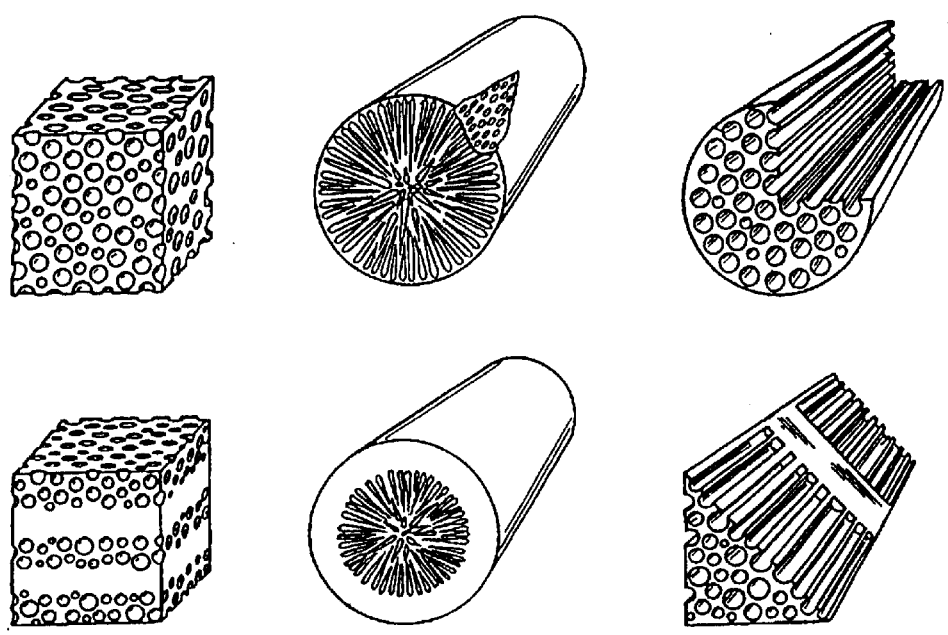
FIG. 1 is a diagrammatic view of various gasar structures that can be used in carrying out the various embodiments of the present invention.

The requirements of the gaseous cells for carrying out the present invention should preferably include the following:

Total amount of gas in each cell should not exceed 10 liters (at 1 atmosphere and 20° C.);

It should preferably have the compact tubular shape for security of optimal stress distribution in walls of cells;

The cell walls should be impermeable for stored gas;

The cell walls should have sufficient toughness to hold out high pressure inside the cells.

The cell walls should not chemically interact with stored gas;

Each cell should advantageously have a mechanism for automatically and very promptly sealing it from other cells, after a sharp decrease of gas pressure in it as a result of destruction.

The multi cellular modules can be produced using various materials in several different ways, including the following:

Some natural porous materials;

From monolithic structures by formation of cells of the necessary size and shape in the structure;

Plastic deformation;

Founding technologies;

Methods of powder metallurgy;

Rapid-Prototyping technology.

It is possible also to make such cellular modules of separate tubes with gas-proof walls. It is particularly advantageous to realize this invention by utilizing new porous materials, especially gasars and tubular variant.

As model gas to illustrate the use of this invention we have selected hydrogen, as this gas gains the increasing distribution for use in aircraft and ground transport. But all calculations and reasoning, reduced below, will be valid for all other gases as well.

The method of storing compressed gases comprising charging with gas at elevated pressure a storage system (Safety Cellular Storage—SCS) includes:

Distributing all volume of the gas in SCS in numerous gas cells, such that each cell has gas volume, which at destruction a cell does not explode;

The cells are maintained in communication with outside atmosphere in such a manner that the gas can leave them by flowing only in one direction;

In a preferred embodiment, the direction of gas flow is such, that at destruction of any given cell and reverting dropping of gas pressure in this cell, the given cell will be isolated from the other cells, thereby preserving the former high gas pressure in these other cells.

The SCS comprises (FIGS. 3–13):

A cellular module 1 having cellular structure, comprising gaseous cells 2 isolated from each other within the module, and in which is stored a main mass of gas;

Minimum one collector 3 ensuring an opportunity of a filling up of SCS by gas and release of the gas for the use;

Minimum one "stop module" 4 which is located between the collector 3 and the cellular module 1, and ensuring self-acting instantaneous sealing of the destroyed cells 2 from the rest of the cells.

The cellular structure should be formed by uninterrupted (inside of the cellular module 1) cells 2 which have geometrical similar orientation like spherical radial orientation, cylindrical radial orientation, or parallel alignment. The cell shape should be tubular and can be cylindrical, cone-shaped, ellipsoidal, irregular cylinder, three-edged, rectangle, square, or polyhedral.

The cell walls should be impermeable (gas-proof) and have average size in section from 10 microns up to 20 mm.

GASAR SCS

New porous materials, known as gasars [19,20], answer almost all the requirements for making cells for storing gas, such as hydrogen, in accordance with the present invention. The high strength and various structure (FIG. 1) of materials, results from the smoothly rounded pore shape, the mirror smooth pore surface finish and the absence of porosity in the interpore spaces. An additional advantage is the cleanliness of the base material [9–14]. The present invention will demonstrate the opportunities arising from this high-pressure hydrogen storage without the risk of explosive gas release. For this purpose it is most appropriate to utilize gasars with cylindrical or ellipsoid pores with diameters of 1–10 millimeters and porosity levels of 60–90%. Charged by hydrogen under a pressure of 60–95 MPa they can have capacitance 4–8% of hydrogen by mass. Being subdivided in micro cylinders, such stored hydrogen will be secure even at 100 MPa pressure.

Figure 2:
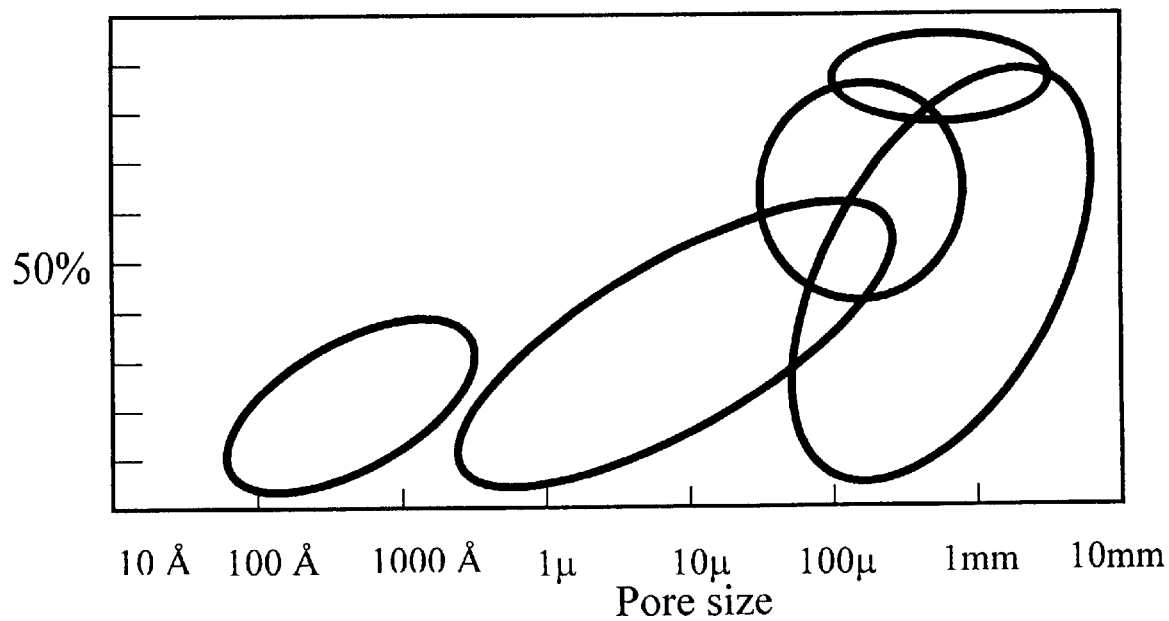
FIG. 2 is a diagrammatic illustration of the relationship between the pore size and the amount of porosity in various porous metals.

FIG. 2 compares the pore size and pore fraction range possible to gasars with other porous materials. Gasar pore size may be varied between 30 μm and 8 mm as desired, and the amount of porosity may reach 80%. They differ from other porous metals by the larger variety of structures and pore space parameters available, by the lower cost and the higher strength. The pore wall surface is always clean. In most cases it shows a high luster but is sometimes not entirely smooth due to the exposure of growth dendrites. The interpore walls are free of any secondary porosity or undesirable inclusions.

The relationship between the average pore diameter and the amount of porosity is an important structural characteristic. A summary of these data for various porous metals, including gasars, is presented in FIG. 2. No method is presently available for making porous metals that combine ultra fine pore size with a high void fraction. Clearly, the existing technologies are complementary in that each of them is applicable to a specific area of engineering application. The metallic matrix of gasars can be iron, nickel, magnesium, aluminum, copper, beryllium and their alloys. It is especially important, that the gasar castings can have a mixed porous-solid structure with a solid skin and a porous core, as is shown in FIG. 3 and others.

Mechanical tests of gasars have shown that their directional pores of below 10 mm in diameter make them superior in resistance to buckling failure to monolithic materials having the same mass and composition. Generally this provides a saving in scarce materials. In addition, gasars are well suited both for machining and for cold forming. They respond to hardening by conventional heat treatment. They can be produced with a directional heat conductivity value lower or greater than that of the monolithic material and they have a good capacity to absorb vibrations and sounds.

Figure 3:
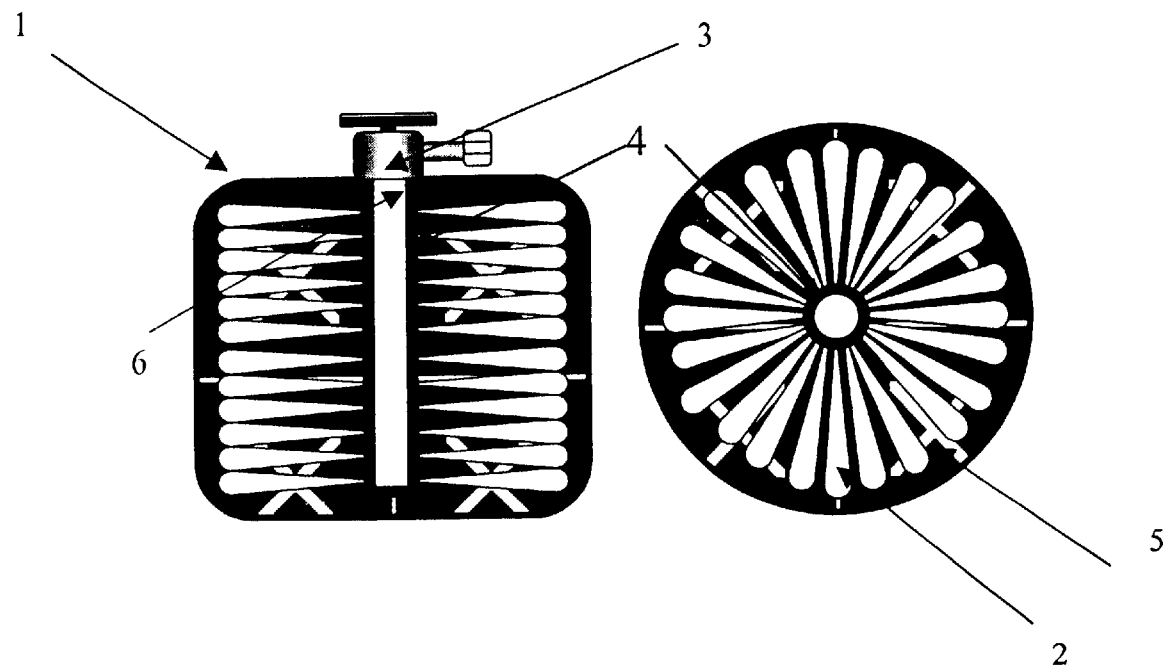
FIG. 3 is a diagrammatic illustration showing the design of gasar SCS with cylindrical radial porosity without refuel module.

One form of storage cell structure according to the present invention utilizes the gasar SCS with radial cylindrical cellular module 1 as shown in FIG. 3. This SCS has solid skin 5, one collector 3, one stop module 4 made of thin wall rubber membrane in the form of a hollow sleeve or tube. Each gas cell 2 has conic shape. The collector 3 is joined to cellular module 1 at an opening 6 in solid skin 5.

Figure 4:
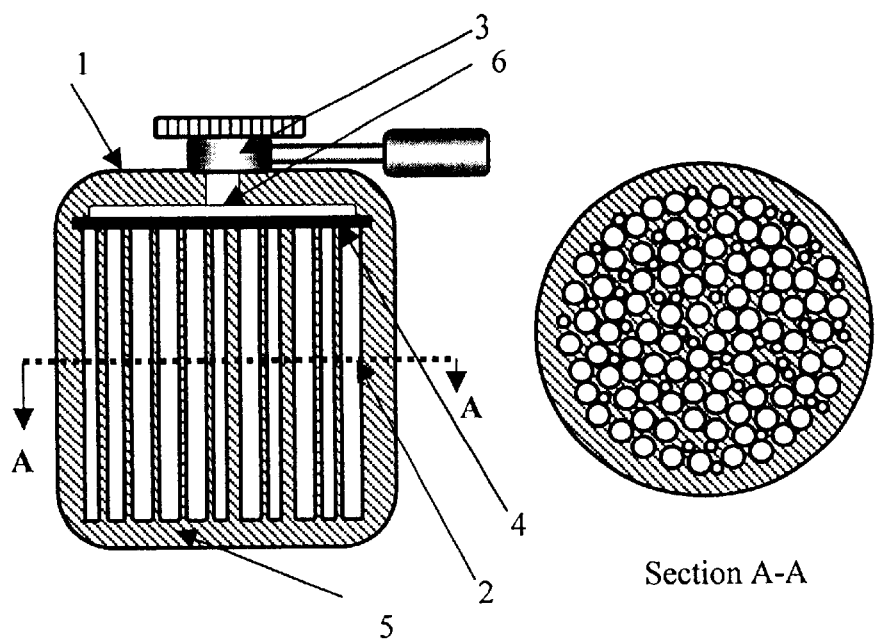
FIG. 4 is a diagrammatic illustration of a design of gasar SCS with parallel porosity without refuel module.

Gasar SCS with parallel cellular module 1 is shown in FIG. 4. This SCS has solid skin 5, one collector 3, one stop module 4 made of thin rubber membrane. Each gas cell 2 has cylindrical shape and different sectional size.

Figure 5:
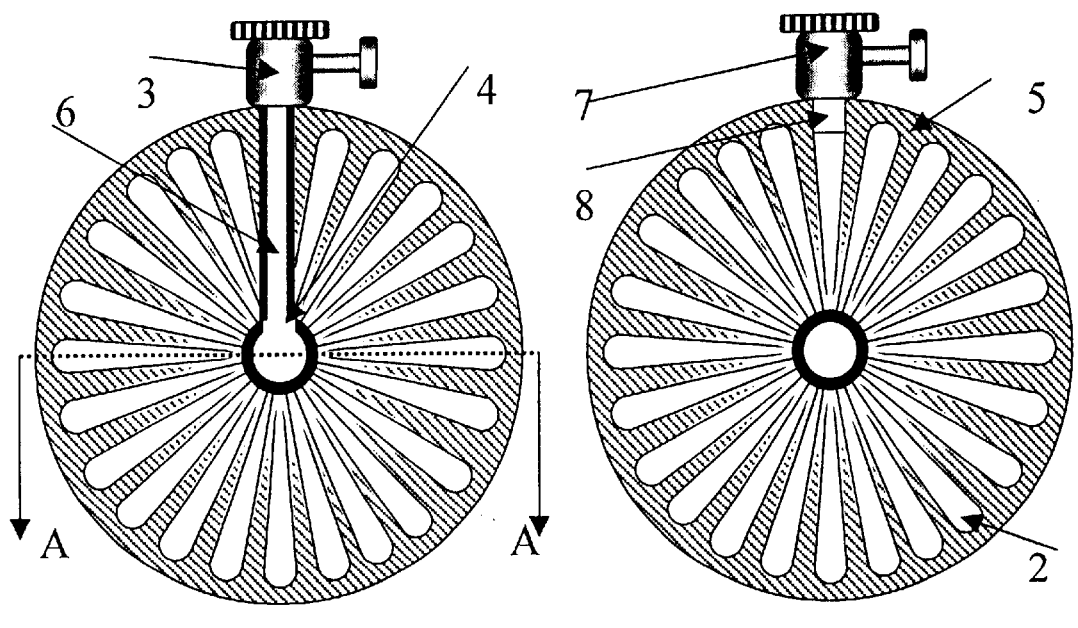
FIG. 5 is a diagrammatic design of two views of multi celled storage system using gasar SCS with spherical radial porosity with refuel module and one collector.
Figure 6:
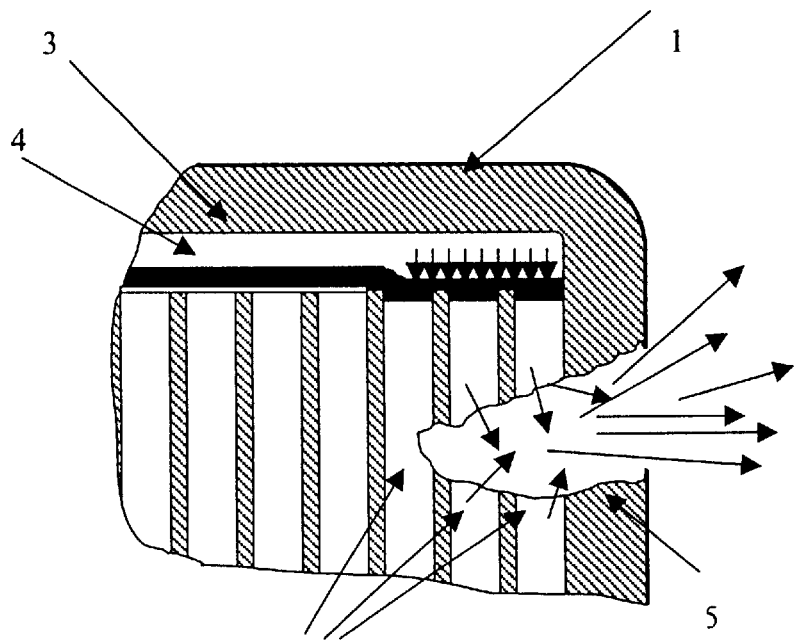
FIG. 6 is a diagrammatic illustration of the stop module (smart rubber) in operation.

Gasar SCS with spherical radial cellular module 1 is shown in FIG. 5. This SCS has solid skin 5, one collector 3, one stop module 4 made of thin rubber tube with one open end. Each gas cell 2 has conical shape. There is a refueling module 7, which is joined to the cellular module 1 at extra opening 8. The extra opening 8 has no stop module.

Stop module 4 represents (FIG. 6) a special design element, which we have named "smart" rubber. It is a thin (about 1-mm thick) rubber film or tube, which covers the internal gas cells' apertures. In a case where outer wall 5 destruction causes gas to escape from one or several cells 2, this "smart" rubber 4 will nestle tightly into these open-ended apertures and block release of gas from the undamaged cells.

Figure 7:
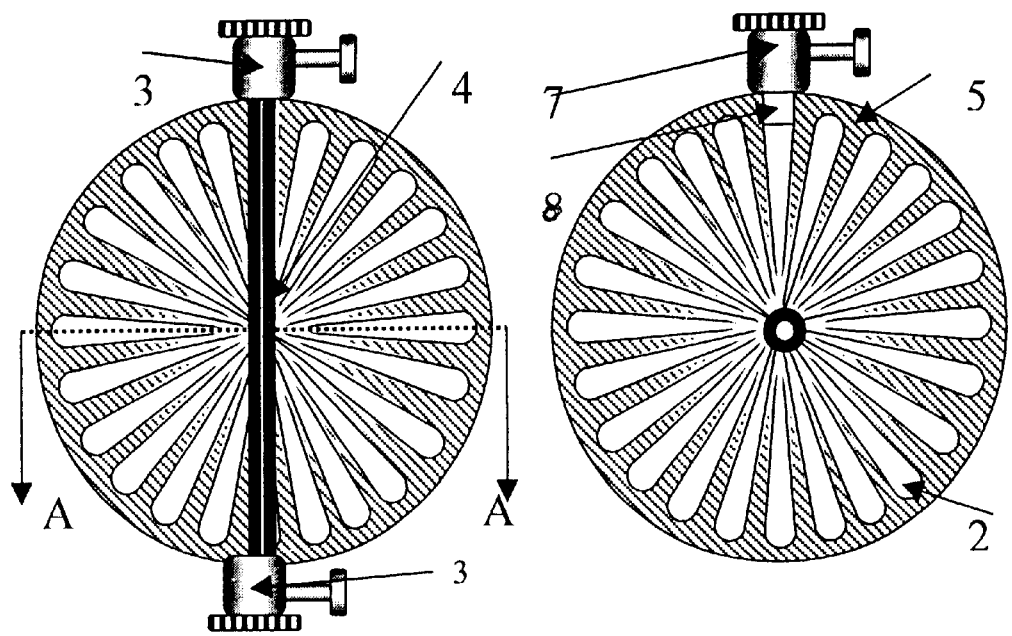
FIG. 7 is a diagrammatic design of gasar SCS with spherical radial porosity with refuel module and two collectors.

Gasar SCS with spherical radial cellular module 1 is shown in FIG. 7. This SCS has solid skin 5, two collectors 3, one stop module 4 made of thin rubber tube. Each gas cell 2 has conical shape. There is a refueling module 7, which is joined to the cellular module 1 at extra opening 8. The extra opening 8 has no stop module.

Figure 8:
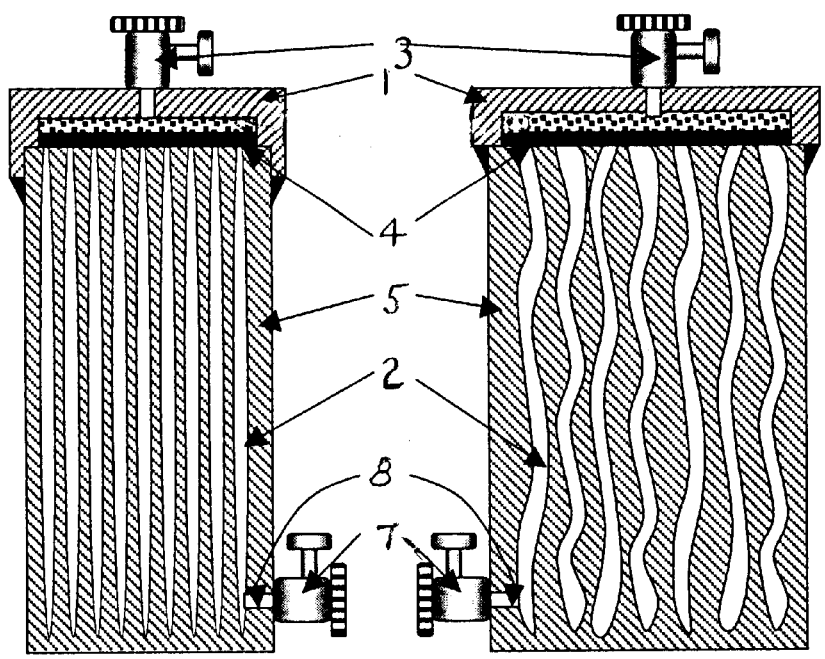
FIG. 8 is a diagrammatic design of gasar SCS with ellipsoidal and irregular parallel porosity with refuel module, one stop module and one collector.

Gasar SCS with parallel cellular module 1 is shown in FIG. 8, left. This SCS has solid skin 5, one collector 3, one stop module 4 made of thin rubber membrane. Each gas cell 2 has ellipsoidal shape. There is a refueling module 7, which is joined to the cellular module 1 at extra opening 8. The extra opening 8 has no stop module.

Gasar SCS with parallel cellular module 1 is shown in FIG. 8, right. This SCS has solid skin 5, one collector 3, one stop module 4 made of thin rubber membrane. Each gas cell 2 has irregular cylindrical shape. There is a refueling module 7, which is joined to the cellular module 1 at extra opening 8. The extra opening 8 has no stop module.

Figure 9:
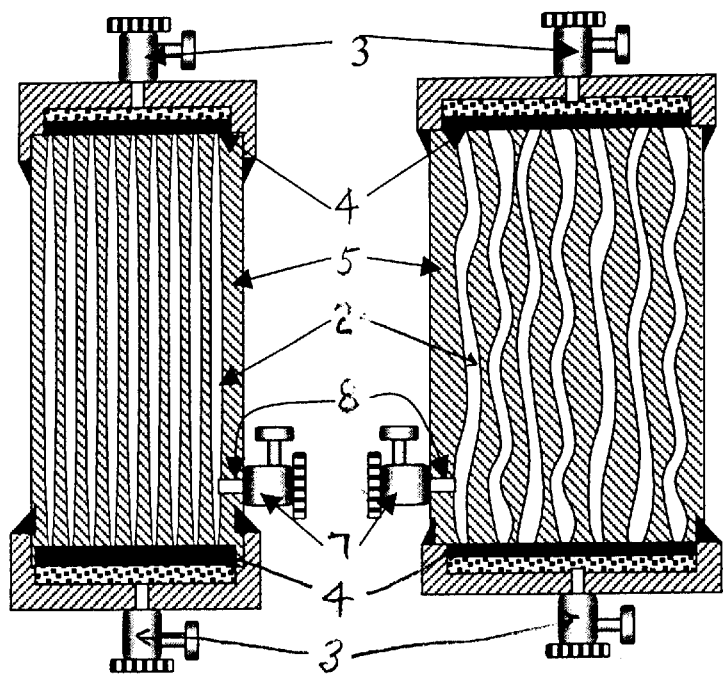
FIG. 9 is a diagrammatic design of gasar SCS with ellipsoidal and irregular cylinder parallel porosity with one refuel module, two stop modules, and two collectors.

Gasar SCS with parallel cellular module 1 is shown in FIG. 9, left. This SCS has solid skin 5, two collectors 3, two stop modules 4 made of thin rubber membrane. Each gas cell 2 has ellipsoidal shape. There is a refueling module 7, which is joined to the cellular module 1 at extra opening 8. The extra opening 8 has no stop module.

Gasar SCS with parallel cellular module 1 is shown in FIG. 9, right. This SCS has solid skin 5, two collectors 3, two stop modules 4 made of thin rubber membrane. Each gas cell 2 has irregular cylindrical shape. There is a refueling module 7, which is joined to the cellular module 1 at extra opening 8. The extra opening 8 has no stop module.

TUBULAR SCS

Figure 10:
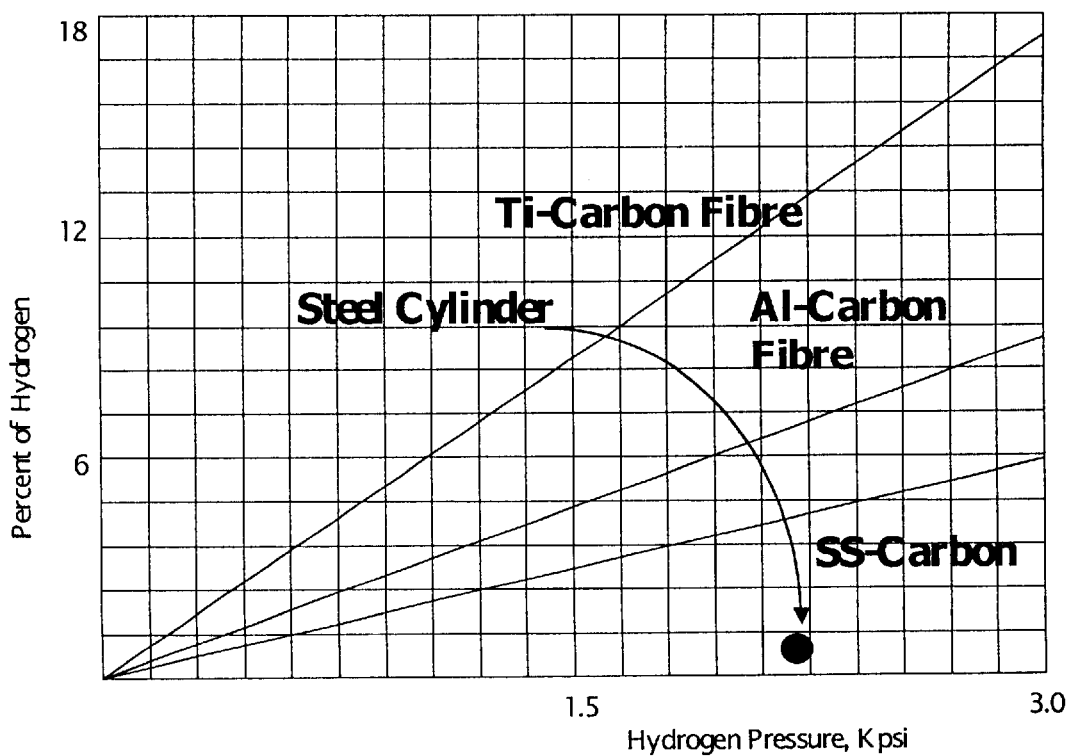
FIG. 10 is a diagrammatic illustration showing the fraction of hydrogen in tubular SCS and different pressures at tube materials.

Calculations show that tubular design of SCS has a very high capacity for storing hydrogen. FIG. 10 shows the mass fraction of hydrogen stored as a function of the pressure in the tubular cells made of different materials.

Figure 11:
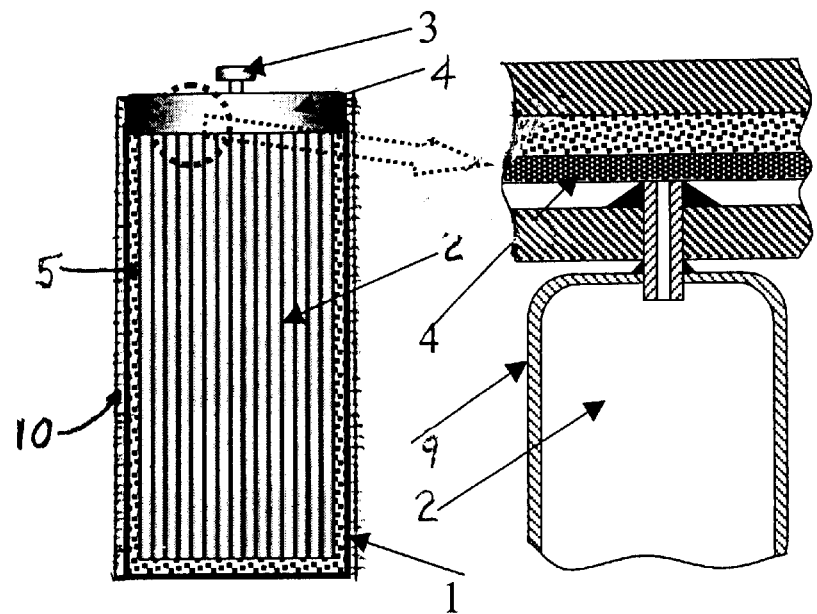
FIG. 11 is a diagrammatic illustration of the design of tubular SCS

A preferred embodiment of the tubular SCS is shown in FIG. 11. Cellular module 1 comprises a package of tubes (cells 2) encased in a solid skin 5, a collector 3, and a stop module 4 made of thin rubber membrane. The cells 2 have thin walls 9, and relatively small diameter and various shapes in section, such as round, square or polygonal. The solid skin 5 is gas-proof and usually made of metal, such as steel, aluminum or high-strength alloys. For the purpose of improving the mechanical properties of the structure and thereby increasing SCS capacity, the solid skin 5 is preferably covered with an outer non-metallic continuous fiber winding wrap 10, which is preferably formed of carbon fiber, which has a very high modulus of elasticity and strength under tension as well as a very low density. Other suitable fibers include fiberglass, Zylon, Kevlars and Nomex. Calculations show that the winding of tubular cells with bore diameter of 6 mm and wall thickness of 0.1 mm with a layer of a carbon fiber with a thickness of 1 mm results in increasing SCS capacity by two and a half times. This design also allows reducing SCS cost by using cheap low carbon steel or aluminum for the gas-proof solid skin 5. Some rise in price due to the cost of carbon fiber is completely canceled by increasing SCS capacity.

A further advantage of the fiber winding wrapped structure described above is its improved degree of safety. Our experiments have shown that in cases where a tearing of the cells occurs, the fiber winding wrap 10 prevents the cells from breaking off in several pieces and scattering in different directions with high velocity. Instead, the cells are broken off in two pieces, which remain fractionally bound oddments of the unaffected fiber.

Tubular SCS can be assembled with tubes having different length and diameter, and the length and the shape of the tubes is selected so, that the cellular module will have outside outlines and sizes relevant to the space for its arranging (automobile gas tank, plane wing etc.). One example is given on FIG. 13.

Figure 12:
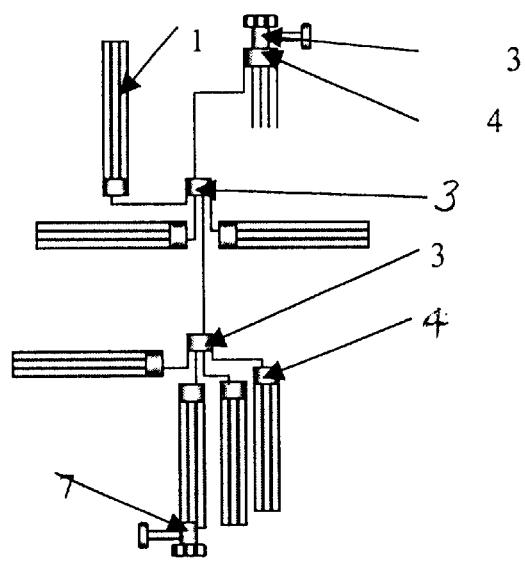
FIG. 12 is a diagrammatic illustration showing a SCS net storage system design.
Figure 13:
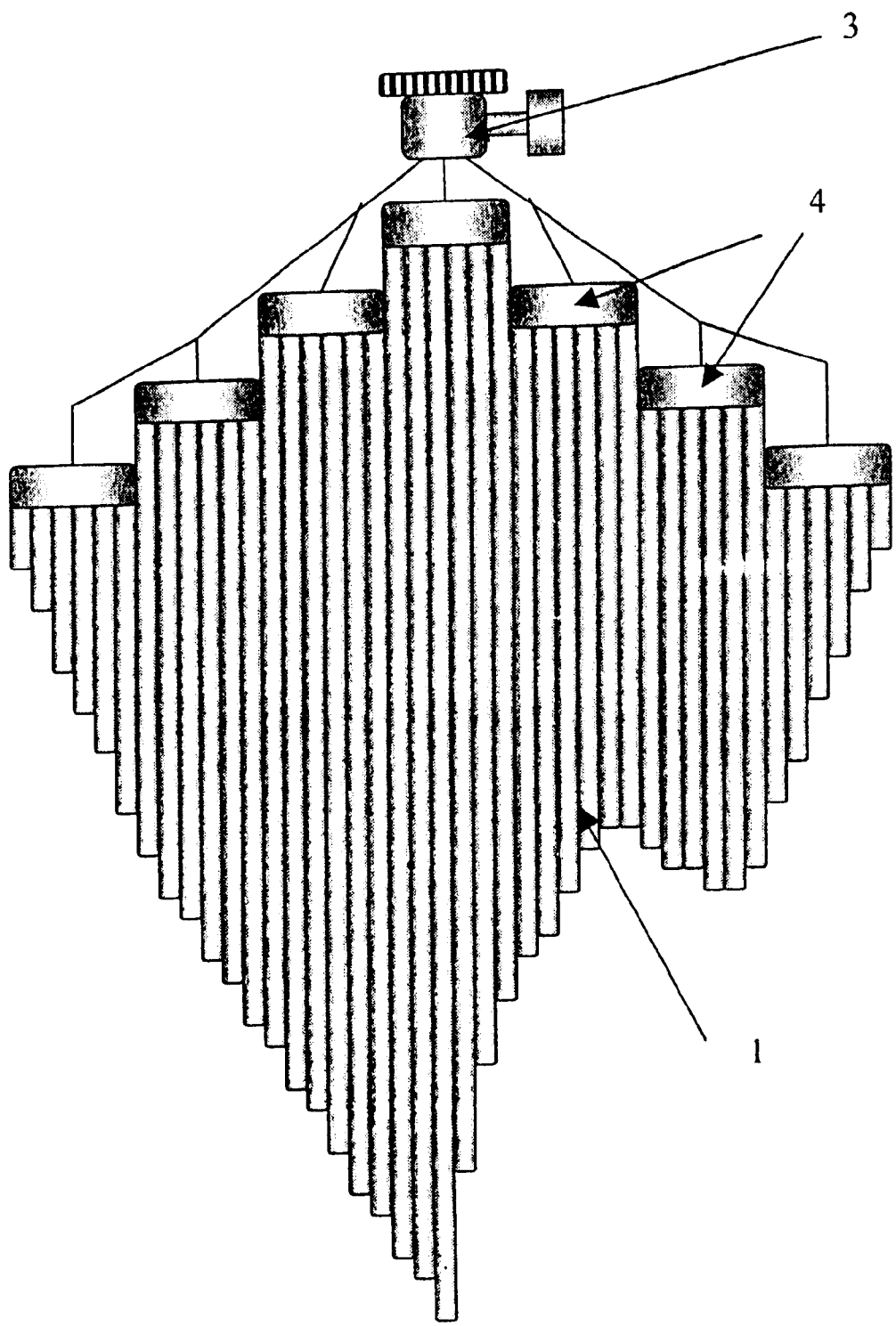
FIG. 13 is a diagrammatic illustration of a tubular SCS net design with complex shape.

SCS can contain a plurality of cell modules which are arranged in a cell module network providing a circulatory system in which each branching place has at least one collector (FIG. 12).

REFERENCES

1. Hydrogen in Semiconductors and Metals. Symposium Proceedings. Volume 513. Apr. 13–17, 1998, San Francisco, Calif, USA.
2. Hydrogen Materials Science & Chemistry of Metal Hydrides. Symposium Proceedings. Sep. 2–8, 1999, Ukraine.
3. Kozin L. F. Hydrogen Energetic is the Power of Future. Hydrogen Materials Science & Chemistry of Metal Hydrides. Symposium Proceedings. Sep. 2–8, 1999, Ukraine.
4. Barnes R. G. Hydrogen Storage Materials. 1988.
5. Hydrogen Energy System: Production and Utilization of Hydrogen and Future Aspects (NATO Asi Series. Series E, Applied Sciences, Vol 295) By Yuda Yurum (editor), September, 1995.
6. Howell D. G. Future of energy Gases, U.S. Geological Survey Professional Paper, #1570, 1993.
7. Proceedings of the 1999 U.S. DOE Hydrogen Program Review, May 1999.
8. Hoffman P. The Forever Fuel: The Story of Hydrogen, 1997.
9. Chand T. K. Hydrogen fuel system for vehicle. U.S. Pat. No. 4,085,709 Apr. 25, 1978).
10. Jan-Mao C. Portable gas stove. U.S. Pat. No. 59,992,408 (Nov. 30, 1999).
11. Wilson E. L. System for automatically selecting and discharging a pressurized cylinder. U.S. Pat. No. 48,889,152 (Dec. 26, 1989).
12. Putruga F. G. Safety gas cylinder containment system. U.S. Pat. No. 4,802,515 (Feb. 7, 1989).
13. Kirk K. G. Compressed gas mobile storage module and lightweight composite cylinders. U.S. Pat. No. 5,385,263 (Jan. 31, 1995).
14. Anderson M. D. Life saving device. U.S. Pat. No. 4,810,219 (Mar. 7, 1989).
15. Collier J. P. Seamless cylinder shell construction. U.S. Pat. No. 5,485,736 (Jan. 23, 1996).
16. Turner M. L. Cylinder pressure switch for automatic fire protection system. U.S. Pat. No. 4,953,624 (Sep. 4, 1990).
17. Edinger W. J. Self-contained containment for gas cylinder. U.S. Pat. No. 4,478,345 (Oct. 23, 1984).
18. Bulow M. Method and vessel for the storage of gas. U.S. Pat. No. 6,006,797 (Dec. 28, 1999).
19. Shapovalov V., Method for manufacturing porous articles U.S. Pat. No. 5,181,549 (Jan. 26, 1993).
20. Shapovalov V. Porous Metals. MRS Bulletin, Apr., #4, 1994, p.24–29.

SUMMARY

A safe cellular storage (SCS) for compressed hydrogen and other gases has a number of advantages over previously known designs such as convenience in operation, safety against explosive gas release at the global and local level, optional high speed extraction of hydrogen, high contents of hydrogen (about 5% by weight), and low cost. The new SCS manufacturing technology arises from a very recent achievement in metallurgy and the science of materials. HHPS consists of a new technology for the production of high-strength porous metals and alloys. This technology generates three-dimensional cast products with several varieties of structure. The objective of this new SCS is to cast articles from stainless steel that are closely and evenly packed with longitudinally or radially oriented cylindrical pores 1–10 mm in diameter at a porosity level of 70–90 volume %. This innovative structure will isolate stored hydrogen into many small elements within the cylinder, so that upon an accident occurring, only damaged elements can leak, reducing the risk of massive explosion. This creative safe design of compressed gas cylinder is a break-through amongst hydrogen storage alternatives.

The SCS can be used to supply hydrogen for ground vehicles, fuel cells, portable hydrogen plasma generators and micro heat generators. Its use will considerably expand hydrogen utilization as an ecologically clean fuel through its use in fuel cells and by direct burning in internal combustion engines. In addition to the direct economic benefit from use of a cheaper storage design, there is an appreciable secondary benefit from the improvement of ecological conditions. Extensive use of this storage method might so increase the use of hydrogen fuel that the present condition of continuously increasing air pollution by hydrocarbon combustion products would reverse itself.

What is claimed is:

1. A method for storing compressed gas comprising introducing said gas at elevated pressure into a plurality of storage cells having a common gas distribution manifold whereby the pressure in the respective storage cells is maintained at substantially the same elevated value, and blocking the flow of gas between the common distribution manifold and a given one of said storage cells in response to a reduction of gas pressure in said given storage cell relative to the gas pressure in the common distribution manifold, such as may occur in the event of a leak in said given storage cell.

2. A system for storing compressed gas comprising a common manifold chamber for receiving gas to be stored, a plurality of storage cells, each of which has a first end open to said common manifold chamber for receiving gas from said chamber for storage in the respective storage cells and for removing stored gas therefrom, and a controllable outlet for said manifold chamber for introducing and removing gas from said system.

3. A system for storing compressed gas as defined in claim 2, wherein the respective ends of each of said storage cells remote from said open first end is closed to confine stored gas in such storage cell.

4. A system for storing compressed gas as defined in claim 2, wherein the respective ends of each of said storage cells remote from said open first end is open to a second common manifold chamber which is provided with a controllable outlet for receiving and removing gas from said system.

5. A storage system as defined in claim 2, wherein the major portion of each of said storage cells is located outside of said manifold chamber, the passageways through the open ends of said storage cells into said manifold chamber are provided with a closure for selectively blocking the passageway of any given storage cell to prevent gas from flowing from said manifold chamber into the respective storage cell when the gas pressure in the respective passageway falls below the pressure of gas in the manifold chamber, thereby isolating the respective cell from the manifold chamber and preventing loss of the system pressure and stored gas in the manifold chamber and remaining storage cells, which would otherwise occur in the event of a leak in the given storage cell that causes such lower pressure to occur in said given passageway.

6. A storage system as defined in claim 3, wherein the major portion of each of said storage cells is located outside of said manifold chamber, the passageways through the open ends of said storage cells into said manifold chamber are provided with a closure for selectively blocking the passageway of any given storage cell to prevent gas from flowing from said manifold chamber into the respective storage cell when the gas pressure in the respective passageway falls below the pressure of gas in the manifold chamber, thereby isolating the respective cell from the manifold chamber and preventing loss of the system pressure and stored gas in the manifold chamber and remaining storage cells, which would otherwise occur in the event of a leak in the given storage cell that causes such lower pressure to occur in said given passageway.

7. A storage system as defined in claim 4, wherein the major portion of each of said storage cells is located outside of both of said manifold chambers, the passageways through the open ends of said storage cells into the respective said manifold chambers are provided with a closure for selectively blocking the passageway of any given storage cell to prevent gas from flowing from the respective manifold chamber into the respective storage cell when the gas pressure in the respective passageway falls below the pressure of gas in the respective manifold chamber, thereby isolating the respective cell from the respective manifold chamber and preventing loss of the system pressure and stored gas in the manifold chambers and remaining storage cells, which would otherwise occur in the event of a leak in the given storage cell that causes such lower pressure to occur in said given passageway.

8. A system for storing compressed gas as defined in claim 5, wherein the passageways through the open ends of said tubes into said manifold chamber are terminated in a common plane within said chamber, and wherein the closure for selectively blocking the passageway of any given storage cell comprises a pliable rubber-like membrane disposed in said chamber in a plane adjacent to the plane of said terminated passageways.

9. A system for storing compressed gas as defined in claim 6, wherein the passageways through the open ends of said tubes into said manifold chamber are terminated in a common plane within said chamber, and wherein the closure for selectively blocking the passageway of any given storage cell comprises a pliable rubber-like membrane disposed in said chamber in a plane adjacent to the plane of said terminated passageways.

10. A system for storing compressed gas as defined in claim 7, wherein the passageways through the open ends of said tubes into the respective manifold chambers are terminated in a respective common plane within the respective chamber, and wherein the closure for selectively blocking the passageway of any given storage cell comprises a pliable rubber-like membrane disposed in the respective chamber in a plane adjacent to the respective plane of said terminated passageways.

11. A system for storing compressed gas as defined in claim 5, wherein the manifold chamber comprises a central core of tubular configuration, the storage cells are disposed radially around said core with their respective ends adjacent said core terminating in passageways open to said chamber, and wherein the closure for selectively blocking the passageway of any given storage cell comprises a rubber-like membrane in the form of a hollow sleeve positioned adjacent the passageways from said storage tubes, and wherein one end of said sleeve is closed and the opposite end thereof is open to a portion of said manifold chamber that is provided with an outlet for accessing said chamber for introduction or removal of gas from the system.

12. A system for storing compressed gas as defined in claim 6, wherein the manifold chamber comprises a central core of tubular configuration, the storage cells are disposed radially around said core with their respective ends adjacent said core terminating in passageways open to said chamber, and wherein the closure for selectively blocking the passageway of any given storage cell comprises a rubber-like membrane in the form of a hollow sleeve positioned adjacent the passageways from said storage tubes, and wherein one end of said sleeve is closed and the opposite end thereof is open to a portion of said manifold chamber that is provided with an outlet for accessing said chamber for introduction or removal of gas from the system.

13. A system for storing compressed gas as defined in claim 5, wherein a controllable inlet is provided for at least one of said cells, whereby gas can be supplied to said system through said inlet during the introduction of gas through the common manifold in order to reduce the tendency that the pressure of gas introduced through the common manifold will cause the closure to block the flow of such gas to the cells.

14. A system for storing compressed gas as defined in claim 6, wherein a controllable inlet is provided for at least one of said cells, whereby gas can be supplied to said system through said inlet during the introduction of gas through the common manifold in order to reduce the tendency that the pressure of gas introduced through the common manifold will cause the closure to block the flow of such gas to the cells.

15. A system for storing compressed gas as defined in claim 7, wherein a controllable inlet is provided for at least one of said cells whereby gas can be supplied to said system through said inlet during the introduction of gas through either of the common manifolds in order to reduce the tendency that the pressure of gas introduced through such common manifold will cause the respective closure to block the flow of gas from such common manifold to the cells.

16. A system for storing compressed gas, as defined in claim 2, wherein plurality of said storage cells are embodied in a cellular module.

17. A system for storing compressed gas, as defined in claim 3, wherein plurality of said storage cells are embodied in a cellular module.

18. A system for storing compressed gas, as defined in claim 4, wherein plurality of said storage cells are embodied in a cellular module.

19. A system for storing compressed gas, as defined in claim 5, wherein plurality of said storage cells are embodied in a cellular module.

20. A system for storing compressed gas as defined in claim 16, wherein the cellular module is comprised of porous material.

21. A system for storing compressed gas as defined in claim 17, wherein the cellular module is comprised of porous material.

22. A system for storing compressed gas as defined in claim 18, wherein the cellular module is comprised of porous material.

23. A system for storing compressed gas as defined in claim 19, wherein the cellular module is comprised of porous material.

24. A system for storing compressed gas as defined in claim 20, wherein the cellular module is comprised of gasar material.

25. A system for storing compressed gas as defined in claim 21, wherein the cellular module is comprised of gasar material.

26. A system for storing compressed gas as defined in claim 22, wherein the cellular module is comprised of gasar material.

27. A system for storing compressed gas as defined in claim 23, wherein the cellular module is comprised of gasar material.

28. A system for storing compressed gas as defined in claim 5, wherein the storage cells are comprised of cellular module formed of gasar material.

29. A system for storing compressed gas as defined in claim 16, wherein the cellular module is formed of monolithic plastic material.

30. A system for storing compressed gas as defined in claim 17, wherein the cellular module is formed of monolithic plastic material.

31. A system for storing compressed gas as defined in claim 18, wherein the cellular module is formed of monolithic plastic material.

32. A system for storing compressed gas as defined in claim 19, wherein the cellular module is formed of monolithic plastic material.

33. A system as defined in claim 16, wherein the cellular module is made of powder material consolidated by methods of powder metallurgy.

34. A system as defined in claim 17, wherein the cellular module is made of powder material consolidated by methods of powder metallurgy.

35. A system as defined in claim 18, wherein the cellular module is made of powder material consolidated by methods of powder metallurgy.

36. A system as defined in claim 19, wherein the cellular module is made of powder material consolidated by methods of powder metallurgy.

37. A system for storing compressed gas as defined in claim 2, wherein the storage cells are of cylindrical configuration.

38. A system for storing compressed gas as defined in claim 16, wherein the storage cells are of cylindrical configuration.

39. A system for storing compressed gas as defined in claim 17, wherein the storage cells are of cylindrical configuration.

40. A system for storing compressed gas as defined in claim 18, wherein the storage cells are of cylindrical configuration.

41. A system for storing compressed gas as defined in claim 19, wherein the storage cells are of cylindrical configuration.

42. A system for storing compressed gas as defined in claim 37, wherein the cells have a diameter in the range of 10 microns to 20 millimeters.

43. A system for storing compressed gas as defined in claim 38, wherein the cells have a diameter in the range of 10 microns to 20 millimeters.

44. A system for storing compressed gas as defined in claim 39, wherein the cells have a diameter in the range of 10 microns to 20 millimeters.

45. A system for storing compressed gas as defined in claim 40, wherein the cells have a diameter in the range of 10 microns to 20 millimeters.

46. A system for storing compressed gas as defined in claim 41, wherein the cells have a diameter in the range of 10 microns to 20 millimeters.

47. A system for storing compressed gas as defined in claim 2, wherein the storage cells are encased in a gas-proof solid skin covered with an outer non-metallic continuous fiber winding wrap.

48. A system for storing compressed gas as defined in claim 5, wherein the storage cells are encased in a gas-proof solid skin covered with an outer non-metallic continuous fiber winding wrap.

49. A system for storing compressed gas as defined in claim 16, wherein said cellular module is encased in a gas-proof solid skin covered with an outer non-metallic continuous fiber winding wrap.

50. A system for storing compressed gas as defined in claim 19, wherein said cellular module is encased in a gas-proof solid skin covered with an outer non-metallic continuous fiber winding wrap.

51. A system for storing compressed gas as defined in claim 47, wherein said fiber winding wrap is formed of carbon fiber.

52. A system for storing compressed gas as defined in claim 48, wherein said fiber winding wrap is formed of carbon fiber.

53. A system for storing compressed gas as defined in claim 49, wherein said fiber winding wrap is formed of carbon fiber.

54. A system for storing compressed gas as defined in claim 50, wherein said fiber winding wrap is formed of carbon fiber.

* * * * *